Jan. 23, 1934.     W. E. WILLIAMS     1,944,202
APPARATUS FOR REPRODUCING SOUND FROM RECORDS
Filed Sept. 18, 1930

INVENTOR
WILLIAM EWART WILLIAMS
BY
ATTORNEY

Patented Jan. 23, 1934

1,944,202

UNITED STATES PATENT OFFICE 1,944,202

APPARATUS FOR REPRODUCING SOUND FROM RECORDS

William Ewart Williams, London, England, assignor to Columbia Phonograph Company, Inc., Bridgeport, Conn., a corporation of New York Application September 18, 1930, Serial No. 482,717, and in Great Britain October 4, 1929

4 Claims. (Cl. 179—100.31)

This invention relates to a sound-reproducing apparatus and has more particular reference to sound reproducing apparatus in which a beam or pencil of light is modified by its passage through or incidence on some form of record of sound vibrations (such record having been produced by physical or material means and being hereinafter referred to as "sound record"), the modified light being thereafter translated into electrical impulses by means of a light sensitive device such as a photo-electric cell.

The invention may be applied to sound records in the form of phonograph records either of the lateral cut or hill-and-dale type or to sound records in the form of a transparent or translucent film in which the sound vibrations are recorded as a wave formation of substantially uniform density.

The invention may also be applied to sound records in the form of a thread, the actual sound vibration being delineated by varying thicknesses of the thread.

The object of the present invention is to provide means whereby the amount or flux of light projected on to the light sensitive device may be caused to vary depending upon the particular characteristics of the recorded sound vibrations as the sound record is traversed.

The invention consists in a method of reproducing sound from a sound record by optical means wherein the intensity of sound reproduced is modified or controlled by a suitably shaped aperture in the optical system.

The invention also consists in sound reproducing apparatus of the kind referred to wherein a diaphragm is arranged in combination with an optical system, such diaphragm having an aperture of shape whereby the amount or flux of light passing to the light sensitive device is varied as the sound record is traversed.

It is preferred that the diaphragm be provided with a triangular or lozenge shaped aperture such that when the image of the sound vibrations is projected into the diaphragm the latter will permit of a varying amount or flux of light to be passed to the light sensitive device depending upon the particular part of the aperture through which the light passes.

Figures 1, 2:
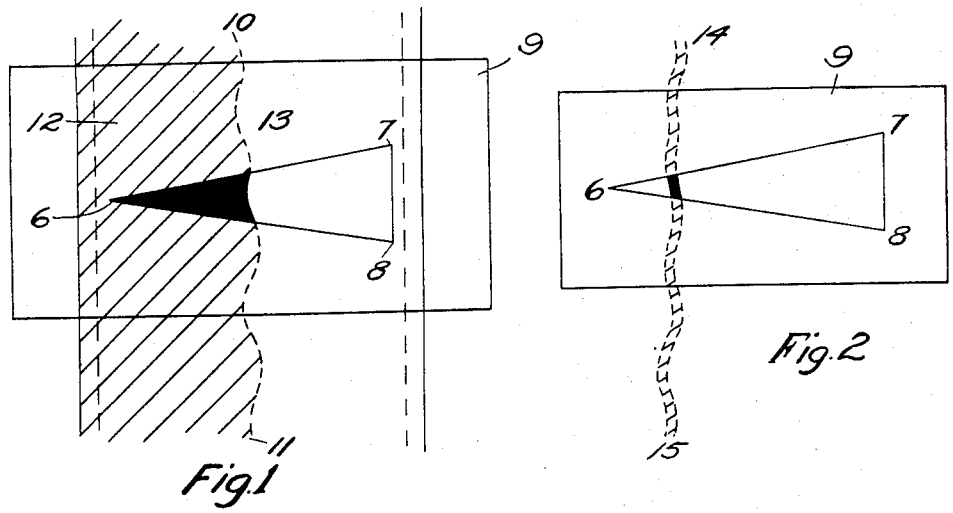
Figure 3:
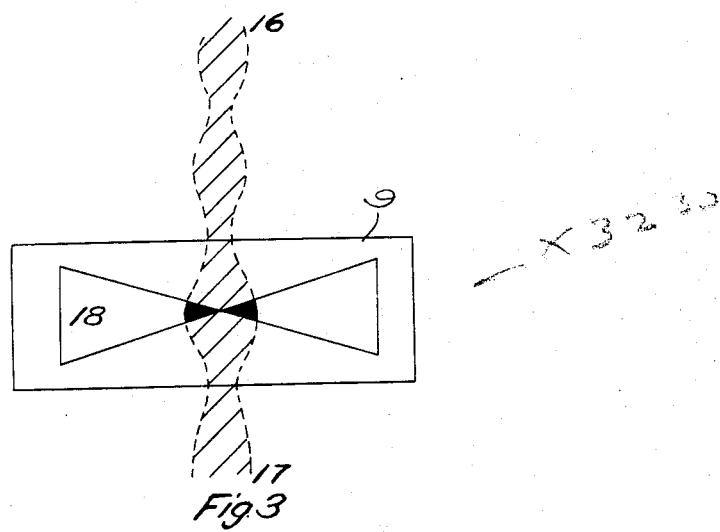
Figures 4, 5:
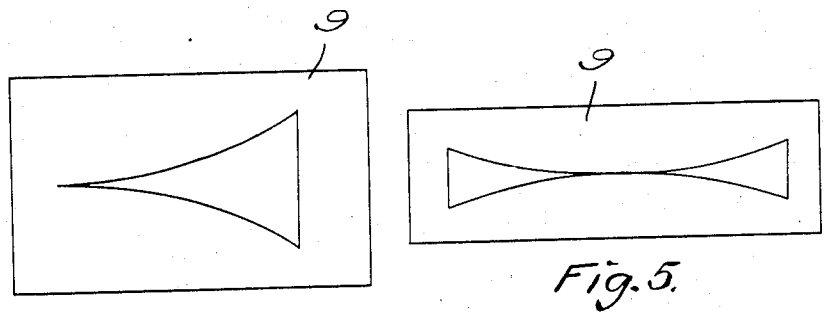

Further features of the invention will become apparent from the following description of modifications thereof given by way of example, which will be more easily understood with reference to the accompanying drawing in which:

Figures 1 and 2 represent one form of the invention applied to reproduction from different forms of sound records, Fig. 3 represents another form of the invention employed with a different form of sound record, and Figs. 4 and 5 represent further forms of the invention.

Referring more particularly to Figs. 1 and 2, 6, 7, and 8 represent a triangular aperture according to the invention through an opaque diaphragm or plate 9. On to this diaphragm is projected by suitable optical means an image of the sound record formed by a beam or pencil of light projected on to the record and reflected therefrom, or transmitted through, or obscured by, the record.

This record according to Fig. 1 may be in the form of a photographic or other suitable film having recorded thereon a wavy line, 10, 11 representing the sounds it is desired to record, which divides the film into portions of different transparency or of different reflecting powers or different in other respects whereby they become optically distinguishable. Thus light reflected from or transmitted through the record reaches the diaphragm or plate as an image of the record having a dark portion 12 and a light portion 13 or vice versa. Alternatively the portion indicated by 11 in Fig. 1 may represent a shadow image of a record having one edge 10—11 cut or serrated in waves representing the sounds recorded. According to Fig. 2 an optical image 14—15 of the sound groove on an ordinary phonograph record may be projected on to the aperture. Alternately 14—15 may represent an image formed by light transmitted through a disc or cylinder record having the recorded groove more or less transparent than the remainder of the disc or cylinder.

It will be appreciated from inspection of the drawing that as the record image is moved parallel with the base of the triangular aperture the portion of the aperture covered by the image will be varied. In this way variations of the amount of light reaching the light-sensitive device for translation into electrical impulses and sound production are effected. The rate and amount of such variations will depend on the frequency and amplitude of the recorded waves, so that the resulting sounds emitted from the final sound producing device will be a faithful reproduction of the sounds recorded.

In an alternative form as shown in Fig. 3 the aperture may take the form of two triangular openings 18 formed apex to apex. This form is more especially useful if the image of the record is of the kind shown at 16—17 where both sides form the record. Such an image may be produced for example as a reflected, or as a shadow, image of a thread in which the sounds are delineated by varying thicknesses along its length. Alternatively such a record may be formed on a film or on a flat band of varying width. It must be understood of course that a single triangular aperture may be employed with records of such forms, and that a double triangular aperture may be used with the forms of record originally described if desired.

It is well known that the amplitude curves of fairly strong low frequency sounds of phonograph records have to be damped or restricted. This results in a deficiency of the larger amplitudes when the record is reproduced by the ordinary mechanical or electrical methods. This deficiency may be corrected according to the present invention by forming the shaped aperture of suitable non-linear shapes. For example, as shown in Fig. 4, the triangular shaped aperture as referred to in the first embodiment of the invention may be provided with curved concave sides. Furthermore, the double triangular aperture previously referred to may also be provided with curved sides (Fig. 5) and the elongated aperture of the diaphragm arranged immediately before the photo-electric cell may also be provided with non-parallel sides.

It will be seen, therefore, that with the above arrangements the light passed to the photo-electric cell is not directly proportional to the displacement of the image relatively to the aperture of the photo-electric cell but increases more than in proportion to the displacement. By suitably choosing the shape of the aperture any desired displacement-response curve may be obtained.

The shaped diaphragm referred to above may form an integral part of the photo-electric cell which latter may, for example, be of the anode plate type.

It will be clear that the method above described may be applied to any form of record suitable for optical reproduction and that the current from the light sensitive device, after amplification, need not be fed to a telephone or loud speaker but may, if desired, be fed to a facsimile device, a transmission line or a television apparatus.

The terms "light" and "optical reproduction" used herein are not intended to limit the invention to visible radiation, but include its use with all forms of electromagnetic waves applicable to the reproduction of sound, it being understood that suitable modifications of the size and substance of the diaphragm and aperture must be made to deal with various portions of the complete electromagnetic spectrum. It is further to be understood that the invention is not limited to use with sound records of the various kinds mentioned, but may be used with any and every form of sound record adapted for optical reproduction; and in addition I am not to be limited to the above details of construction since I may vary the precise shape of the apertures employed, the particular arrangement of the lens systems and the form of light sensitive device, all depending upon any practical considerations that may have to be fulfilled.

Having now particularly described and ascertained the nature of my said invention and in what manner the same is to be performed, I declare that what I claim is:—

1. In a device for the purpose described, a plate having a triangularly shaped aperture therethrough, and the edges of said aperture between its base and apex being concave.

2. In a device for the purpose stated, a plate having an aperture therethrough, and said aperture being in the form of a double triangle.

3. In a device for the purpose stated, a plate having an aperture therethrough, and said aperture being in the form of a pair of triangles with their apexes arranged in abutting relationship.

4. In a device for the purpose described, a plate having an aperture therethrough, said aperture being in the form of a double triangle, and the edges of said triangles between their bases and apexes being concave.

WILLIAM EWART WILLIAMS.